(12) United States Patent
El-Mansouri et al.

(10) Patent No.: US 11,973,341 B2
(45) Date of Patent: Apr. 30, 2024

(54) SURGE-IMMUNE DC INPUT SUPPLY APPARATUS

(71) Applicant: Schweitzer Engineering Laboratories, Inc., Pullman, WA (US)

(72) Inventors: Adam S. El-Mansouri, Boise, ID (US); Anthony L. Randall, Pullman, WA (US); Valeriy F. Wold, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 417 days.

(21) Appl. No.: 17/398,458

(22) Filed: Aug. 10, 2021

(65) Prior Publication Data
US 2023/0048562 A1 Feb. 16, 2023

(51) Int. Cl.
| H02H 9/00 | (2006.01) |
| H02H 1/00 | (2006.01) |
| H02H 3/00 | (2006.01) |
| H02H 9/04 | (2006.01) |

(52) U.S. Cl.
CPC ............ *H02H 9/04* (2013.01); *H02H 1/0007* (2013.01); *H02H 3/003* (2013.01)

(58) Field of Classification Search
None
See application file for complete search history.

(56) References Cited

U.S. PATENT DOCUMENTS

| 4,420,784 A | 12/1983 | Chen |
| 4,618,906 A | 10/1986 | Paice |
| 4,652,962 A | 3/1987 | Howell |
| 4,704,652 A | 11/1987 | Billings |
| 5,652,688 A | 7/1997 | Lee |
| 6,956,725 B2 | 10/2005 | Boughton, Jr. |
| 9,231,402 B2 * | 1/2016 | Landry ................. H02H 9/041 |
| 2002/0117975 A1* | 8/2002 | Yang ...................... H05B 45/56 315/291 |
| 2004/0052012 A1 | 3/2004 | Boughton, Jr. |
| 2012/0014027 A1* | 1/2012 | Lin ......................... H02H 9/046 361/111 |
| 2013/0003242 A1* | 1/2013 | Lin ......................... H02H 9/046 361/111 |

OTHER PUBLICATIONS

Analog Devices, LTC4359, Rev. F, Dec. 2021. retrieved from https://www.analog.com/en/products/ltc4359.html?doc=LTC4359.pdf#product-documentation on Mar. 15, 2021.

* cited by examiner

*Primary Examiner* — Stephen W Jackson
(74) *Attorney, Agent, or Firm* — Fletcher Yoder, P.C.; Richard M. Edge (57) ABSTRACT

A DC power supply may use an input supply surge protection circuit that may be robust against positive and negative power surges. DC power may be provided through a first unidirectional circuit component such as a diode or selectively controlled MOSFET coupled in parallel with a transient voltage suppressor or Zener diode. The first unidirectional circuit component may have a first voltage rating and the transient voltage suppressor or Zener diode may have a second voltage rating lower than the first voltage rating. This may allow current to flow backward over the transient voltage suppressor or Zener diode to protect the first unidirectional circuit component from exposure to voltage beyond the first voltage rating in a power surge.

19 Claims, 6 Drawing Sheets

SURGE-IMMUNE DC INPUT SUPPLY APPARATUS

BACKGROUND

This disclosure relates to surge protection for a device that uses a direct current (DC) input supply.

Many electronic devices operate using direct current (DC) power. A DC input supply of a device receives power from an external source that is delivered through wired connections. The DC power source provides a constant output voltage that is within the device specification tolerance. DC power supply distribution networks are prevalent in industrial applications to route power to various equipment (e.g., manufacturing facilities).

Under certain circumstances, a surge event (e.g., a transient voltage caused by a lightning strike, high voltage transients from adjacent wires, or a short between two or more conductive lines) could occur that could cause coupling of the high energy disturbance signal into the device supply wires. These wires propagate this disturbance energy to the input device input supply connector causing damage or malfunction unless it is mitigated. To this end, circuits and components within many electric devices may be rated to withstand such a surge event in compliance with certain equipment standards, such as IEC 61000-4-5 and IEC 60255-26. Some techniques for guarding against a surge at the supply input, however, may entail selecting circuit topologies and devices at significant cost and size.

DETAILED DESCRIPTION

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

Embodiments of the present disclosure are directed to establishing a surge-immune or surge-resistant DC input supply, particularly for use in electronic control systems and electronic communication systems (e.g., an SEL-2742S Software-Defined Network Switch). External power from an external power source is delivered to a device via conducted cables to the input supply circuit of the device that in turn distribute the power to an internal power delivery system. The input supply circuit forms a direct interface between the external power source and the device. The input supply circuit may be designed to withstand various external environmental events to ensure the integrity and safety of the device. Of particular interest in this disclosure is the ability of the input supply circuit to withstand surges. In general, a surge is a transient wave of current, voltage, or power in an electric circuit. In power systems in particular, a surge or transient is a sub-cycle overvoltage with a much shorter duration than the normal voltage waveform; it may be less than a half-cycle of the normal waveform. A surge may be of either positive or negative polarity. Surges may arise out of certain environmental causes such as lightning strikes or short-circuits caused by the contact between two or more conductive wires (e.g., a line-to-line fault). Several standards, such as the measuring relays and protective equipment standard IEC 60255-26, define a surge immunity requirement to certify a product or device's ability to withstand environmental surge events on the input supply circuit. Other standards such as IEC 610000-4-5 also govern surge immunity in certain devices.

Certain devices may use more than one DC input supply. A device may use a primary power supply and one or more backup power supplies (e.g., a battery backup) to maintain operations during a temporary power outage. For example, a digital relay may use a backup power supply to continue operating within power transmission and distribution systems during a temporary interruption to the digital relay's primary power supply. Certain devices may have internal circuits with a variety of different operating parameters. These different operating parameters may be satisfied by using multiple DC input supplies.

To ensure surge immunity or surge-resistance in an input power supply circuit, various components and devices with abilities to regulate or handle large current and/or voltage spikes may be used. For instance, one or more bidirectional transient voltage suppressors (TVS), diodes, or metal-oxide varistors (MOVs) may be used to shunt current away from sensitive devices or components when activated and clamp the voltage experienced by the rest of the circuit. A standard diode may be used to allow current to flow through the circuit in one direction, but act as an open-circuit and prevent the flow of current in the reverse direction. A metal-oxide field-effect transistor (MOSFET), such as an nMOS transistor, may be used in place of the diode. To enable the nMOS to mimic the characteristics of the standard diode, a controller may be coupled to the nMOS to shut off the gate when it senses a polarity reversal. Additionally, a Zener diode or TVS diode may be placed in parallel across the nMOS transistor in order to regulate the voltage across the nMOS transistor and ensure that the nMOS transistor does not experience a voltage above what it is rated to handle. A bulk capacitor may also be used to absorb surge current and/or act as a temporary power source if the power supply is interrupted (e.g., due to a surge event).

Figure 1:
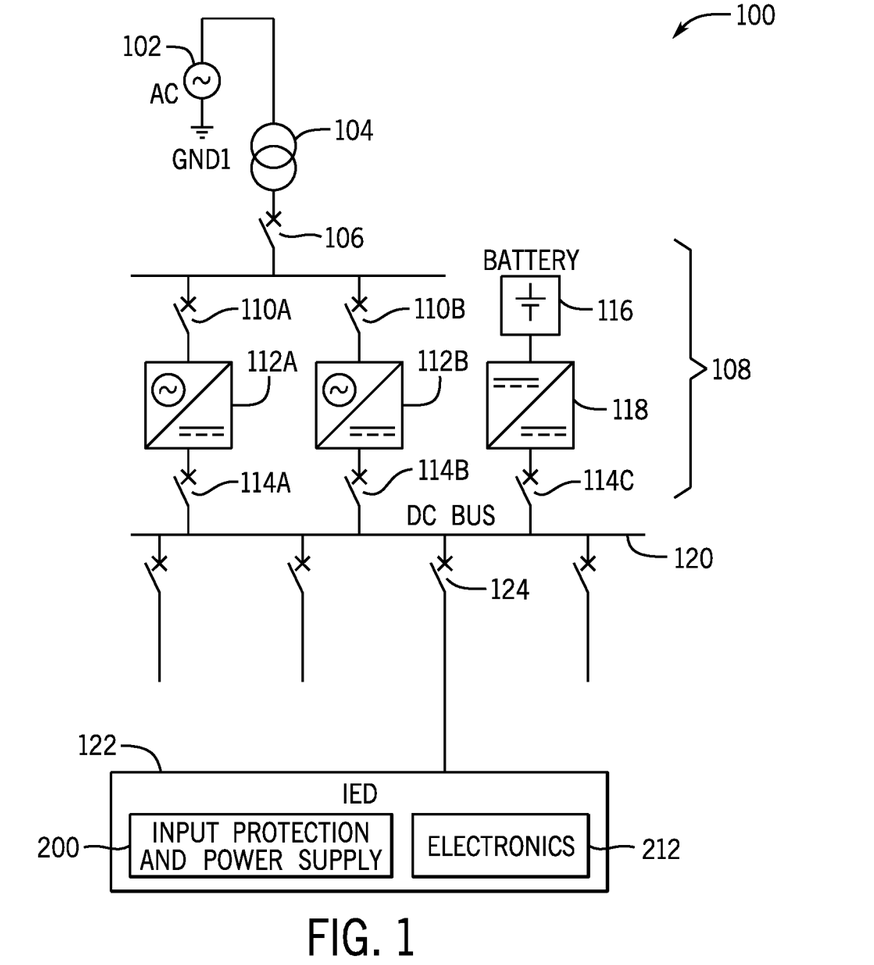
FIG. 1 is a schematic diagram of an embodiment of a (DC) power distribution system, in accordance with an embodiment.

FIG. 1 is a schematic diagram of a direct current (DC) power distribution system 100. The DC power distribution system 100 may receive power from an alternating current (AC) power supply 102. The AC power supply 102 may feed power to a transformer 104 (e.g., a step-down transformer), which, when the switch 106 is closed, may in turn feed power to a power conversion circuit 108. The power conversion circuit may include switches 110A and 110B that, when closed, allow the power from the transformer 104 to feed to one or more AC-to-DC (AC-DC) power converters 112A and 112B. The AC-DC power converters 112A and 112B may include one or more rectifiers. The AC-DC power converters 112A and 112B may be coupled to switches 114A and 114B, respectively. A battery 116 may operate as a backup power supply in the event of an upstream power failure (e.g., a fault in the AC power supply 102). The battery 116 may feed into a DC-to-DC (DC-DC) power converter 118 in order to adjust the voltage to meet the operational parameters of a downstream DC-powered device or system (e.g., a device 122). The DC-DC power converter 118 may be coupled to a switch 114C. The switches 114A, 114B, and 114C may enable DC power from the corresponding converter (e.g., 112A, 112B, and 118, respectively) to be delivered to one or more downstream DC-powered devices (e.g., the device 122) via the DC bus 120. Upon the closing of switch 124, DC power may be delivered to the device 122. The device 122 may be an intelligent electronic device (IED) such as an electronic control system or an electronic communication system (e.g., an SEL-2742S Software-Defined Network Switch). The device 122 may include a DC input supply surge protection circuit 200 and a load (e.g., a system 212). The DC input supply surge protection circuit 200 will be described in greater detail below in FIG. 3.

Figure 2:
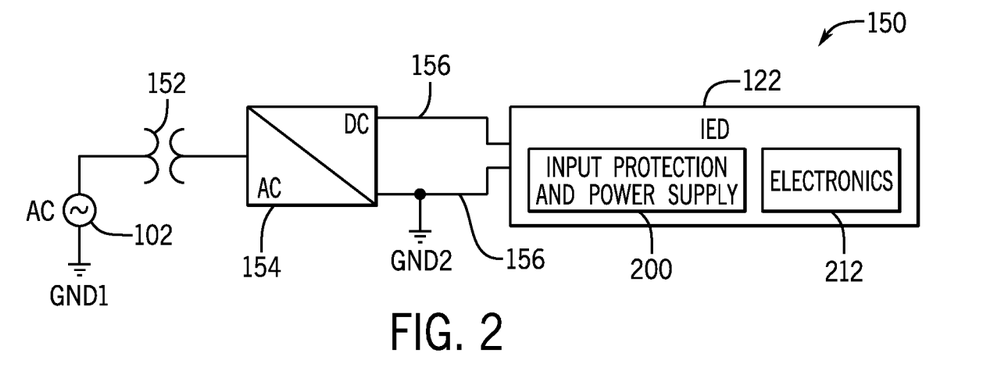
FIG. 2 is a schematic diagram of an AC-to-DC conversion system, in accordance with an embodiment.

FIG. 2 is an AC-DC power conversion system 150. The AC-DC conversion system 150 may be used additionally or alternatively to the DC power distribution system 100. FIG. 2 describes an AC-DC conversion application in which the AC power supply 102 is connected to an AC-DC power converter 154 that provides DC power to the device 122. The AC power supply 102 may feed power to a transformer 152 (e.g., a step-down transformer), which may feed into the AC-DC power converter 154. The AC-DC power converter 154 may provide DC power to the device 122 via the DC powerlines 156. Similarly to FIG. 1, the device 122 may include the DC input supply surge protection circuit 200 and the system 212. In the embodiment described in FIG. 2, the DC input supply surge protection circuit 200 may be used to protect against surges originating with the AC power supply 102 and propagating to the DC powerlines 156.

Figure 3:
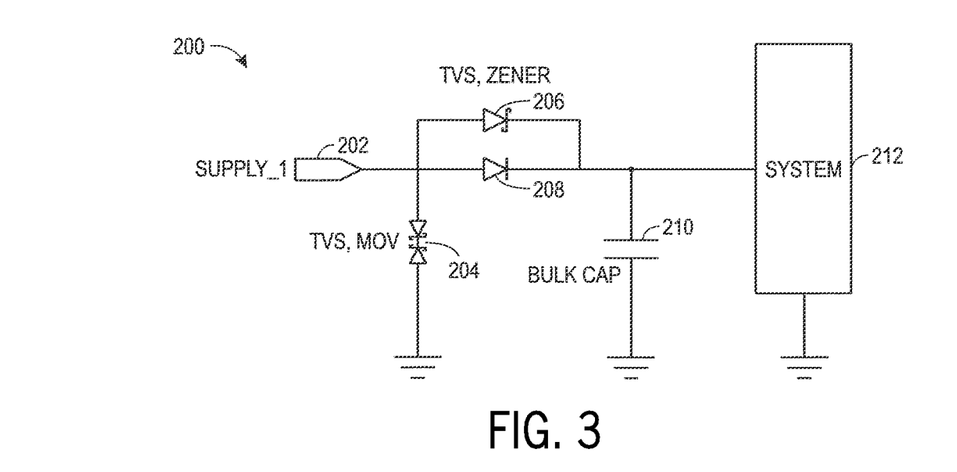
FIG. 3 is a schematic diagram of an embodiment of a surge protection circuit for a device using a DC input supply, in accordance with an embodiment.

FIG. 3 is a schematic diagram of a DC input supply surge protection circuit 200 mentioned above. The DC input supply surge protection circuit 200 may receive DC voltage and/or current (e.g., from the AC-DC power converters 112A, 112B, 154 or the DC-DC power converter 118) that may be used by one or more components within, or downstream from, the DC input supply surge protection circuit 200. The DC input supply surge protection circuit 200 may include an input power supply connection 202, which may receive input power that is to be delivered to a system 212, which may represent any suitable electric device that consumes DC power or DC power delivery system for electric devices that consume DC power (e.g., the electronics within the device 122).

The DC input supply surge protection circuit 200 may also contain one or more components intended to prevent surges or transients from damaging the DC input supply surge protection circuit 200 or the devices and components within. These components may include a bidirectional transient voltage suppressor (TVS) diode or metal-oxide varistor (MOV), or both (referred to herein as a ground TVS/MOV 204), a Zener diode 206, a unidirectional circuit component such as a diode 208, and a bulk capacitor 210 coupled to a power supply input of the system 212. Zener diodes (such as the Zener diode 206) have operating characteristics similar to those of a TVS diode (such as the TVS/MOV 204). The primary difference between the two components is that Zener diodes are generally designed to regulate voltage, while TVS diodes are generally designed to suppress transients. Thus, the Zener diode 206 may be replaced by a TVS diode depending on the particular operating parameters of the circuit in which the components may be used. In the interest of clarity and simplicity, the component will be illustrated and referred to as the Zener diode 206.

The DC input supply surge protection circuit 200 may experience surge events that result in spikes of voltage and current (e.g., voltage spikes may reach from ±500 V to ±2 kV, while current spikes may reach up to ±2 kA). The TVS/MOV 204 may remain latent, having a high impedance and leaking very little current. When a surge occurs, however, the TVS/MOV 204 may act as a low-resistance path and shunt current away from the rest of the DC input supply surge protection circuit 200. By doing so, the TVS/MOV 204 may clamp the surge at or below a voltage that the other components and devices within the DC input supply surge protection circuit 200 are rated to handle. For example, if the DC input supply surge protection circuit 200 experience a voltage surge of 1 kV, a TVS/MOV 204 designed with a clamping voltage of 120 V will shunt the excess current to ground, resulting in the rest of the DC input supply surge protection circuit 200 experiencing only 120 V.

The diode 208 allows current to flow in the forward direction (here, from the input power supply connection 202 to the system 212), but will act as an open circuit if the potential across the diode 208 reverses. Thus, the diode 208 will prevent current from flowing in the reverse direction (here, from the system 212 and bulk capacitor 210 to the input power supply connection 202). The Zener diode 206 may be placed in parallel across the diode 208. When current is flowing in the forward direction, the Zener diode 206 may allow current to pass, only contributing a small voltage drop due to its internal resistance. When current is flowing in the reverse direction, however, the Zener diode 206 may operate in a Zener breakdown region. In the Zener breakdown region, the Zener diode 206 may allow current to pass in the reverse direction and act as a voltage regulator for the diode 208, preventing the diode 208 from experiencing a voltage above what the diode 208 is rated to handle. To ensure that the diode 208 does not experience a voltage stress above its rating, the Zener diode 206 may have a voltage rating sufficiently lower than the voltage rating of the diode 208. The difference between the voltage rating of the Zener diode 206 from the voltage rating of the diode 208 may be defined by a ratio that may be sufficient to ensure that an overvoltage event is not likely to occur on the diode 208 by some threshold level of certainty. For example, the difference between the voltage ratings may be 5% different, 10% different, 15% different, or 20% different, to provide a few examples. The difference between the voltage ratings may be based on a defined voltage difference such as 1V, 2V, 5V, 10V, 20V, 50V, 100V, 200V, 500V, or 1 kV. In one example, if the diode 208 were rated to handle −60 V, the Zener diode 206 may be rated for −50 V. Because the Zener diode 206 is in parallel with the diode 208, the voltage across the Zener diode 206 in this example would set the voltage across the diode 208 at −50 V, ensuring a buffer between the voltage across the diode 208 and its maximum voltage rating.

Additionally, during a positive surge event, the bulk capacitor 210 may absorb the current produced by the positive surge event, further preventing the surge from damaging the system 212. The bulk capacitor 210 may temporarily act as a power source for the system 212 if the input power supply connection 202 is interrupted (e.g., by a surge event). While, for the purposes of clarity and simplicity, it is not illustrated, the bulk capacitor 210 may be connected to an inrush controller. The inrush controller may be placed in series with the bulk capacitor 210 to prevent a power-up in-rush current from charging the bulk capacitor 210 too quickly. Without the use of the inrush controller, an excess current may be drawn for the supply source causing supply instability and exceeding product specification limits. The inrush controller may be a negative temperature coefficient (NTC) thermistor, a fixed resistor, or one or more MOSFETs.

Because surges may result in large voltage spikes, the components (such as the TVS/MOV 204, the Zener diode 206, and the diode 208) in the DC input supply surge protection circuit 200 may be selected to be large and robust to ensure a sufficiently high voltage and/or current rating. Large components, however, may be costly and may consume substantial space on a printed circuit board (PCB) or in an integrated circuit (IC). Indeed, some components may not be available with a voltage and/or current rating high enough to withstand the surges that may be experienced by the DC input supply surge protection circuit 200. To address this issue, a component or set of components may be arranged in series with several other components or sets of components to reduce the voltage stress experienced by any one component or set of components.

Figure 4:
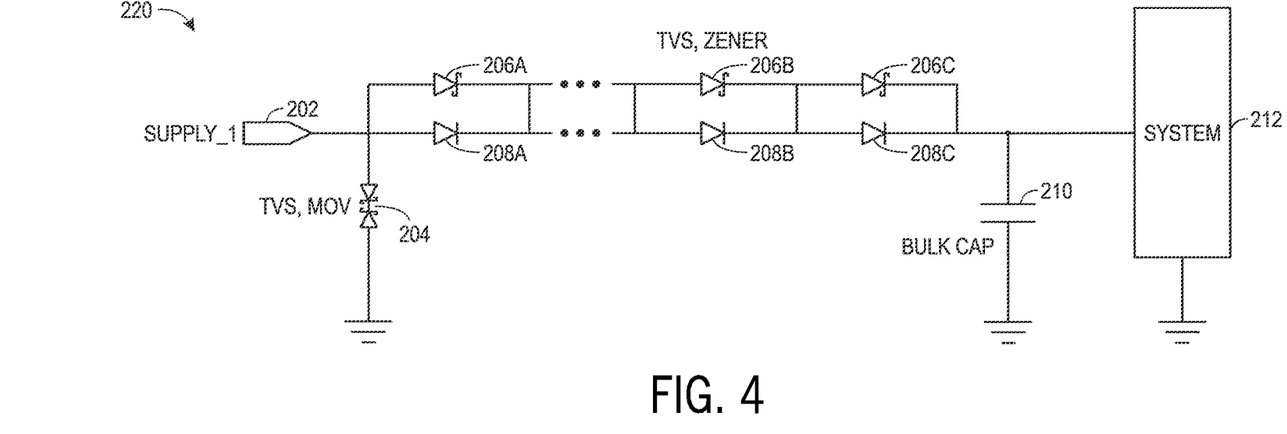
FIG. 4 is a schematic diagram of an embodiment of a cascaded surge protection circuit for a device using a DC input supply, in accordance with an embodiment.

FIG. 4 is a schematic diagram of a DC input supply surge protection circuit 220 that illustrates the cascaded circuitry that may assist in the surge protection of the DC input supply surge protection circuit 220. As can be seen, instead of having one diode 208 with a Zener diode 206 in parallel, the example of FIG. 4 uses a cascaded structure with multiple diodes 208A, 208B, and 208C, each in parallel with its own Zener diode 206A, 206B, and 206C. Using the same example from the discussion of FIG. 3, if the DC input supply surge protection circuit 220 experiences a voltage surge of 1 kV, the TVS/MOV 204 may clamp the voltage at 120 V. However, the 120 V voltage stress is now spread out among the several diodes 208A-208C and Zener diodes 206A-206C. This cascaded structure may ensure that no one diode 208 or Zener diode 206 experiences a voltage stress above its rating. The cascaded structure may also allow a designer to use smaller components with lower voltage ratings, which may result in lower cost and less space consumed on a PCB or IC.

While FIG. 4 shows three sets of the diodes 208 in parallel with the Zener diodes 206, it should be noted that the DC input supply surge protection circuit 220 may include a greater or lesser number of sets of diodes 208 and Zener diodes 206. The number of sets of diodes 208 and Zener diodes 206 may depend on the voltage and surge currents expected to be experienced by the DC input supply surge protection circuit 220 and the voltage and/or current ratings of the individual components (e.g., the TVS/MOV 204, the diode 208, and the Zener diode 206). For example, if the diodes 208A-208C and the Zener diodes 206A-206C are selected to be larger with greater voltage and/or current ratings, fewer diode 208/Zener diode 206 sets may be placed in series. However, if the diodes 208A-208C and the Zener diodes 206A-206C are selected to be smaller with lower voltage and/or current ratings (perhaps for the reasons of cost or space constraints), there may be a use for a greater number of the diode 208/Zener diode 206 sets in series. Further, the components in series may or may not have the same voltage and current rating as the other components in series. For example, the diode 208A may have the same rating as the diode 208B. The diodes 208A and 208B may have a different rating than the diode 208C. The same may be true for the Zener diodes 206A-C.

Figure 5:
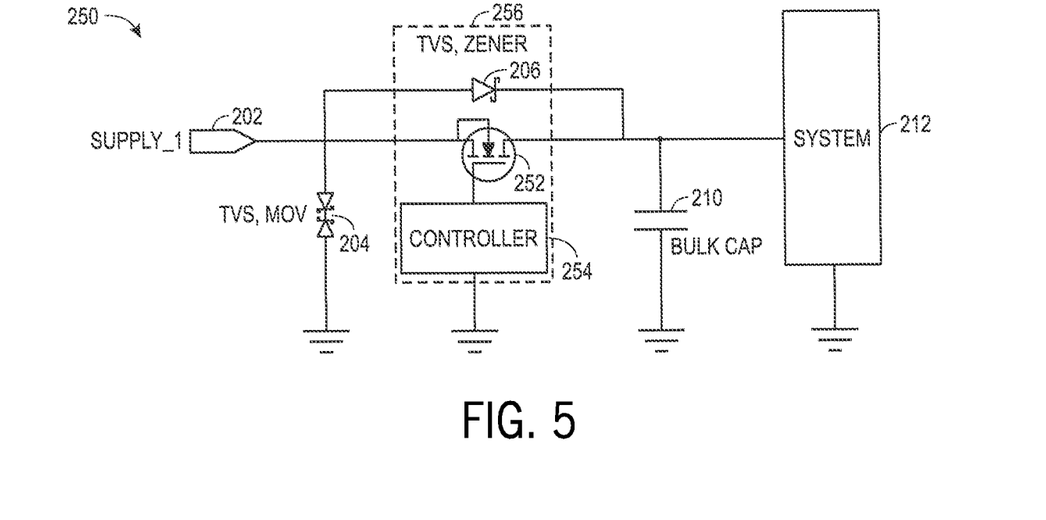
FIG. 5 is a schematic diagram of an embodiment of a surge protection circuit, implemented using a transistor, for a device using a DC input supply, in accordance with an embodiment.

The DC input supply surge protection circuit 200 in FIG. 3 and the DC input supply surge protection circuit 220 in FIG. 4 use one or more diodes 208 as unidirectional circuit components to ensure the flow of current in the forward direction but limit the flow of current in the reverse direction. The function of the diode 208 may, however, be accomplished by another unidirectional circuit component such as an n-channel MOSFET (nMOS transistor). FIG. 5 illustrates a schematic diagram of a DC input supply surge protection circuit 250 that uses an nMOS transistor 252 rather than the diode 208. MOSFETs, unlike diodes, may generally operate by allowing current to flow in either direction through the channel of the MOSFET. To ensure that the nMOS transistor 252 operates similarly to diode 208 (e.g., allows current in one direction and limits current in the opposite direction), a controller 254 may be connected to the nMOS transistor 252. The controller 254 may detect the voltage ($V_{DS}$) across the nMOS transistor 252 and control the gate of the nMOS transistor 252 accordingly.

Figure 6:
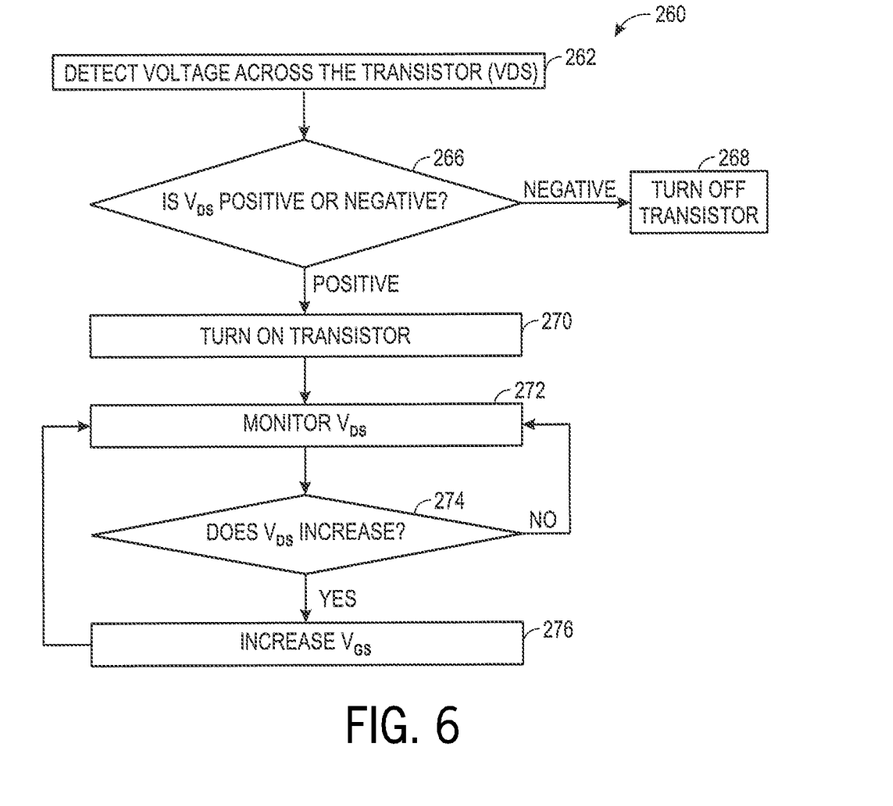
FIG. 6 is a flowchart of a method of the operation of a controller coupled to a transistor, in accordance with an embodiment.

FIG. 6 is a flowchart 260 of a method of the operation of the controller 254. At block 262, the controller 254 may detect the voltage at each end (e.g., at the drain and the source or $V_{DS}$) of the nMOS transistor 252. At query 266, the controller 254 may determine if the voltage across the transistor $V_{DS}$ is positive or negative. If $V_{DS}$ is negative (e.g., the voltage is greater on the side of the system 212 than it is on the side of the input power supply connection 202) the controller will turn the nMOS transistor 252 off, as may be seen at block 268. The controller 254 may accomplish this by cutting off voltage to the gate of the nMOS transistor 252. However, if $V_{DS}$ is positive (e.g., the voltage is greater on the side of the input power supply connection 202 than it is on the side of the system 212), the controller 254 will supply voltage to the gate of the nMOS transistor 252, turning it on and allowing current to flow through the nMOS transistor 252, as shown at block 270.

One advantage to using the nMOS transistor 252 and the controller 254 may be a reduction in power consumed when compared to a circuit using the diode 208. The controller 254 may reduce the amount of power consumed in the DC input supply surge protection circuit 250 by adjusting the gate voltage ($V_{GS}$) and internal resistance of the nMOS transistor 252 as $V_{DS}$ increases. At block 272, the controller 254 may continue to monitor $V_{DS}$ to detect an increase in voltage across nMOS transistor 252 (at query 274). If the controller 254 does not sense an increase in $V_{DS}$, it will simply continue to monitor $V_{DS}$. If, however, the controller 254 senses an increase in $V_{DS}$, the controller 254 may increase the gate voltage $V_{GS}$ of the nMOS transistor 252, as shown in block 276. By doing so, the controller 254 reduces the internal resistance of the nMOS transistor 252, reducing the voltage drop across the nMOS transistor 252 and subsequently reducing power consumption.

Thus, the controller 254 may manipulate the nMOS transistor 252 into behaving as a more power-efficient version of diode 208. With this in mind, it can be seen that the DC input supply surge protection circuit 250 in FIG. 5 may operate in a way largely similar to that of DC input supply surge protection circuit 200 in FIG. 3. In the event of a surge to the DC input supply surge protection circuit 250, the TVS/MOV 204 may clamp the voltage experienced by the nMOS circuit 256 (nMOS circuit 256 having the Zener diode 206, the nMOS transistor 252, and the controller 254) and the system 212. The Zener diode 206 in parallel with the nMOS transistor 252 may reduce any potential surge current to the nMOS transistor 252 by allowing current to flow in the forward direction (e.g., from input power supply connection 202 to system 212) during a positive surge event. During a negative surge event, as current flows in the reverse direction (e.g., from the system 212 to the input power supply connection 202) the Zener diode 206 may begin to operate in Zener breakdown. As the Zener diode 206 is in parallel with the nMOS transistor 252 and the controller 254, the Zener diode 206 may regulate the voltage across the nMOS transistor 252 and the controller 254. To ensure that the nMOS transistor 252 and the controller 254 do not exceed their voltage rating, the Zener diode 206 may be selected to have a voltage rating sufficiently below the voltage rating of the nMOS transistor 252 and the controller 254. For example, if the nMOS transistor 252 and the controller 254 have a voltage rating of –60 V, the Zener diode 206 may be selected to have a voltage rating of –50 V. Thus, when the DC input supply surge protection circuit 250 experiences a negative surge event, the Zener diode will maintain a voltage drop of –50 V, establishing a buffer ensuring that the nMOS transistor 252 and the controller 254 do not reach or exceed their maximum voltage rating of –60 V.

The DC input supply surge protection circuit 250 may still face several cost and space constraints. Controllers such as controller 254 are generally not rated to handle the surge voltages and currents that the DC input supply surge protection circuit 250 may experience. Likewise, it may be difficult to find nMOS transistors (such as the nMOS transistor 252) and Zener diodes (such as the Zener diode 206) rated to handle such surge voltages and currents, and if they can be found they may be expensive and may take up substantial space on a printed circuit board (PCB) or integrated circuit (IC). To address this issue, multiple configurations of certain components and devices within the DC input supply surge protection circuit 250 (such as the nMOS circuit 256) may be arranged in series, as is shown in DC input supply surge protection circuit 290 in FIG. 7. As previously stated, the cascaded configuration, such as the configuration seen in the DC input supply surge protection circuit 290 and earlier in DC input supply surge protection circuit 220 in FIG. 4, may ensure that the voltage stress is spread across multiple components or sets of components. Thus, instead of one component or set of components (such as nMOS circuit 256) experiencing the entirety of the voltage stress between the TVS/MOV 204 and the bulk capacitor 210, that voltage stress is distributed amongst multiple components or sets of components. Thus, the cascaded configuration of the DC input supply surge protection circuit 290 may reduce the voltage stress experienced by any one nMOS circuit 256 by distributing the voltage stress across multiple nMOS circuits 256A and 256B that respectively include TVS/Zener diodes 206A and 206B, nMOS transistors 252A and 252B, and controllers 254A and 254B. Thus, certain components within the nMOS circuit 256 (e.g., the Zener diodes 206A and 206B, the nMOS transistor 252A and 252B, and the controller 254A and 254B) may be chosen with a lower voltage or current rating, which may result in lower costs and less space consumed in manufacturing the DC input supply surge protection circuit 290.

Figure 7:
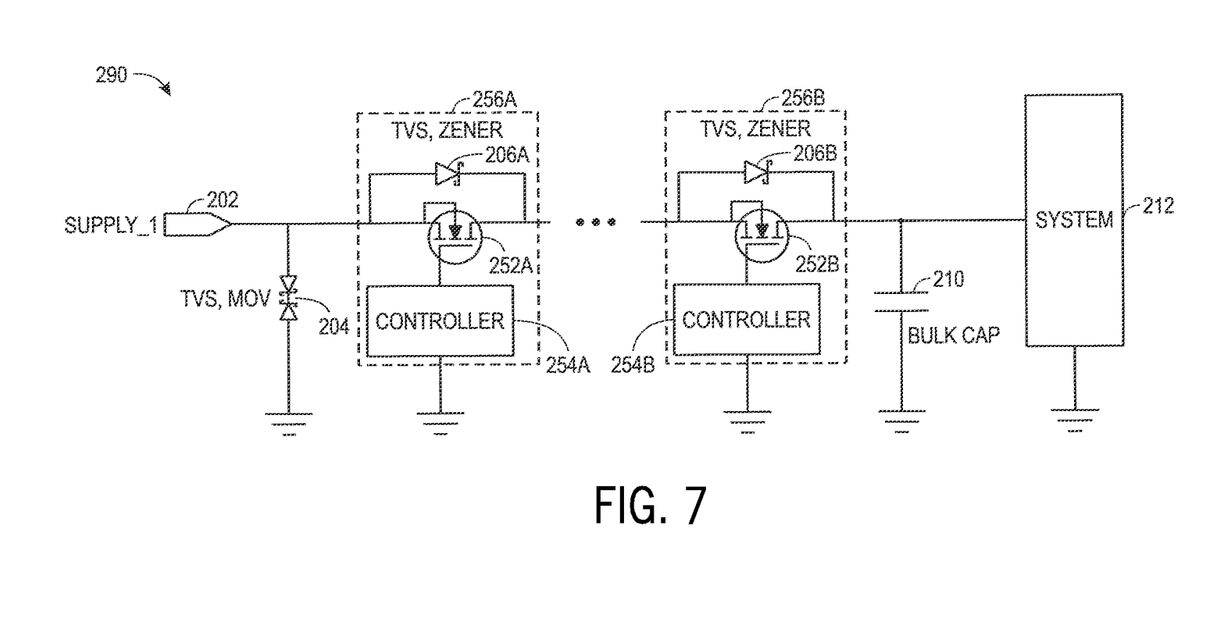
FIG. 7 is a schematic diagram of an embodiment of a cascaded surge protection circuit, implemented using transistors, for a device using a DC input supply, in accordance with an embodiment.

While the DC input supply surge protection circuit 290 is shown to have two nMOS circuits 256A and 256B in series, it should be noted that the DC input supply surge protection circuit 290 may contain a lesser or greater number of nMOS circuits 256, as deemed appropriate for the purpose of any particular variation of the DC input supply surge protection circuit 290. The number of nMOS circuits 256 may depend on the surge voltage and surge current expected to be experienced within the DC input supply surge protection circuit 290, as well as the voltage or current ratings of the individual components within the DC input supply surge protection circuit 290. For example, if the components within the nMOS circuit 256 are chosen to have a greater voltage and/or current rating, fewer nMOS circuits 256 may be placed in series with each other to ensure sufficient surge protection. However, if the components within the nMOS circuit 256 are selected to have a lower voltage and/or current rating, a greater number of nMOS circuits 256 may be placed in series with each other to ensure no one nMOS circuit 256 experiences a voltage stress above its rating. Further, the components within each nMOS circuit 256A may or may not have the same ratings as the components in 256B. For example, in some implementations, the nMOS transistor 252A may have a different rating than the nMOS transistor 252B. In other implementations, the nMOS transistors 252A and 252B may have the same rating.

Figure 8:
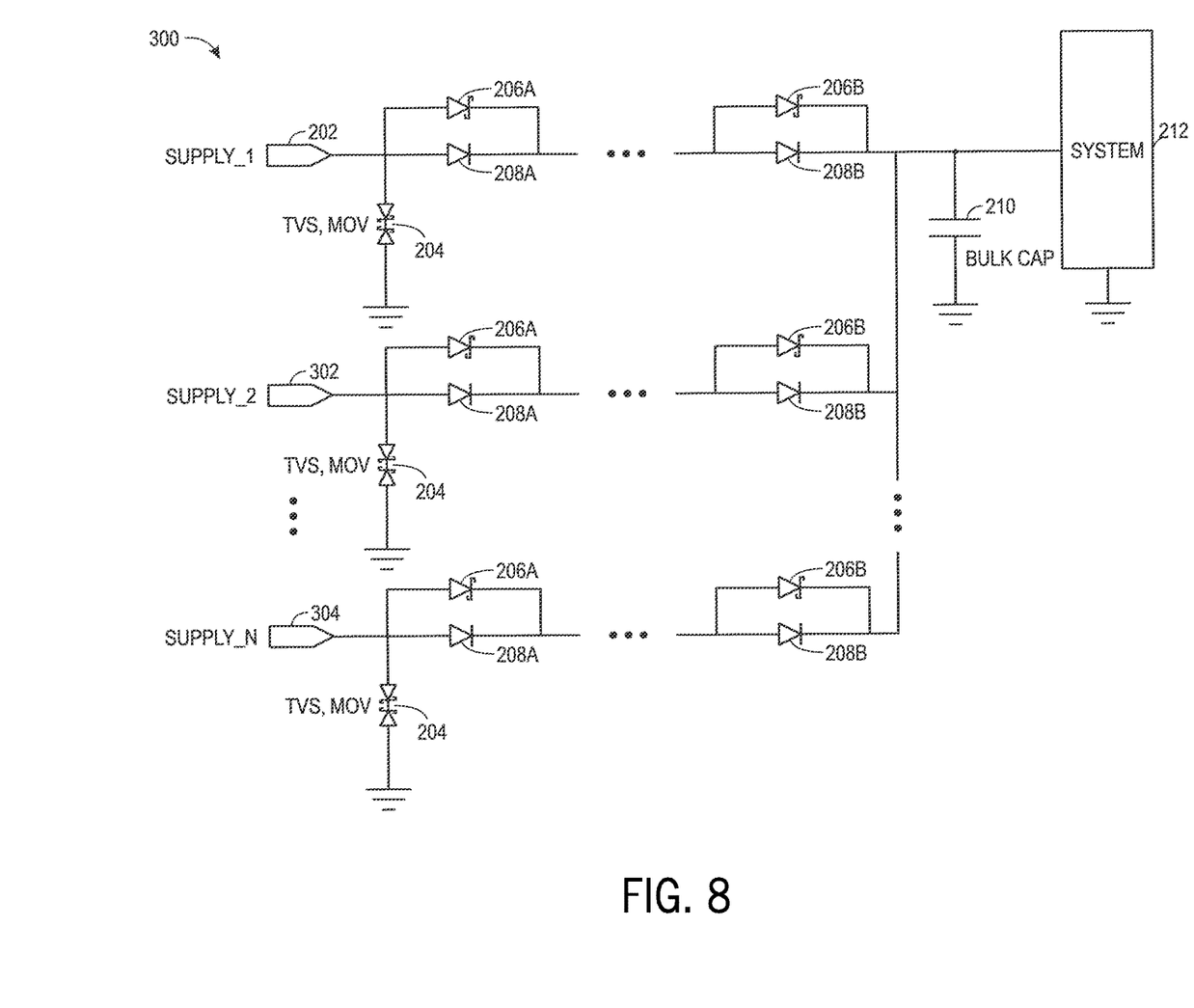
FIG. 8 is a schematic diagram of an embodiment of a cascaded surge protection circuit for a device using multiple DC input supply connections, in accordance with an embodiment.

FIG. 8 is a schematic diagram of a DC input supply surge protection circuit 300 that may use diodes 208 and may have multiple input power supply connections 202, 302, and 304. An electronic device that uses a DC input supply may use multiple DC input power supply connections for a variety of reasons. Such an electronic device may use a primary power supply connection and one or more backup power supply connections (e.g., a battery backup such as the battery 116) to maintain operations during a temporary power outage. Certain devices may also use multiple voltages to supply various internal circuits with different operating parameters. Thus, the input power supply connections 202, 302, and 304 may each supply a different voltage and current. Further, in certain embodiments, only one input supply connection may supply power to the DC input supply surge protection circuit 300 at a time. A controller may monitor the positive voltage supplied by the input supply connections 202, 302, and 304. The controller may auto-select whichever of the input supply connections has the highest positive input supply voltage.

Each input power supply connection 202, 302, and 304 may have its own components and devices to protect against surge events. For instance, input power supply connections 202, 302, and 304 each may have a TVS/MOV 204 and multiple sets of diodes 208 and Zener diodes 206. As can be seen, the diode 208A and the Zener diode 206A are in parallel with each other but in series with the diode 208B and the Zener diode 206B. This accomplishes the distribution of voltage stress as is illustrated in DC input supply surge protection circuit 220 in FIG. 4. Indeed, each individual input power supply connection 202, 302, and 304 and the accompanying surge protection components may operate just as the DC input supply surge protection circuit 220 operates in FIG. 4. For example, the input power supply connection 302 may have a TVS/MOV 204 to clamp a surge voltage. The input power supply connection 302 may also have one or more sets of the diodes 208 and the Zener diodes 206 in series. Further, while DC input supply surge protection circuit 300 illustrates only one bulk capacitor 210, there may be a bulk capacitor 210 for each input power supply connection 202, 302, and 304 in certain implementations. Moreover, there may be a bulk capacitor 210 between some or all of the series-connected pairs of diodes 208 and Zener diodes 206. Additionally or alternatively, there may be a TVS/MOV 204 between some or all of the series-connected pairs of diodes 208 and Zener diodes 206.

While two sets of diodes (e.g., 206A, 208A, 206B, and 208B) are shown on each input power supply connection 202, 302, and 304, there may be more or fewer sets of diodes. The number of sets of diodes used will depend on the rating of the diodes 208 and Zener diodes 206, as well as the rating of the other components within the DC input supply surge protection circuit 300 (e.g., the TVS/MOV 204) and the expected surge voltage and surge currents. Additionally, while there are three input power supply connections shown (e.g., 202, 302, 304), there may be more or fewer input power supply connections in other implementations of DC input supply surge protection circuit 300. The number of input power supply connections will depend on the operating parameters of the system 212 among other factors.

Figure 9:
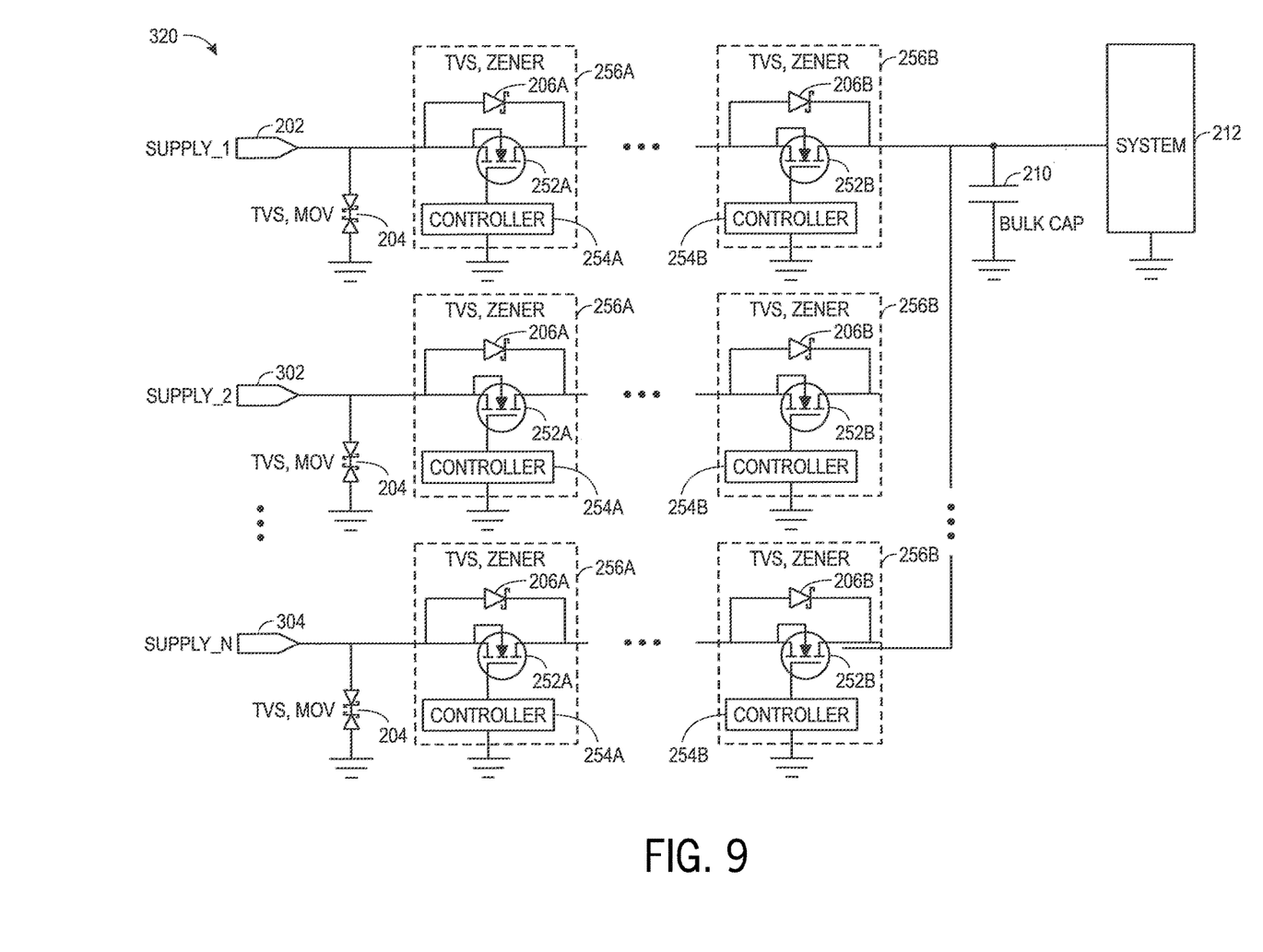
FIG. 9 is a schematic diagram of an embodiment of a cascaded surge protection circuit, implemented using transistors, for a device using multiple DC input supply connections, in accordance with an embodiment.

FIG. 9 is a schematic diagram of a DC input supply surge protection circuit 320 having multiple input power supply connections 202, 302, and 304. DC input supply surge protection circuit 320 may use the nMOS transistors 252 and the controllers 254 in place of the diodes 208 of FIG. 8. As previously illustrated in the flowchart 260 of FIG. 6, the controller 254 may manipulate the nMOS transistor 252 into operating similarly to the diodes 208. Each input power supply connection 202, 302, and 304 may have its own nMOS circuits 256A and 256B placed in series to reduce the voltage stress across any one nMOS circuit 256. As previously stated, in certain embodiments only one input supply connection may supply power to the DC input supply surge protection circuit 320 at a time. A controller may monitor the positive voltage supplied by the input supply connections 202, 302, and 304. The controller may auto-select whichever of the input supply connections has the highest positive input supply voltage.

As in the case in FIG. 8, the number of the nMOS circuits 256 and the input power supply connections 202, 302, and 304 shown in FIG. 9 is merely illustrative and may vary depending on a number of factors; particularly the operating parameters of the system 212. For example, the DC input supply surge protection circuit may have one input power supply connection, or may have four or more input power supply connections. Further, each input power supply connection 202, 302, and 304 may have a different number of nMOS circuits 256. For example, the input power supply connection 202 and the input power supply connection 302 may each have two nMOS circuits 256 (similar to the nMOS circuits 256A and 256B shown). However, the input power supply connection 304 may have three or more nMOS circuits 256. Additionally, while the DC input supply surge protection circuit 320 illustrates only one bulk capacitor 210, each input power supply connection 202, 302, and 304 may have their own bulk capacitor 210. Moreover, some input power supply connections may have a single nMOS circuit 256, while others may have more than one. Indeed, aspects of the examples of FIGS. 3-9 may be used in any suitable combination.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. Input power supply protection circuitry comprising:
   an input power supply connection configured to receive input power;
   a first unidirectional circuit component coupled between the input power supply connection and a device that consumes the input power, wherein the first unidirectional circuit component is configured to enable current to flow only in a first direction and block current flow in a second direction opposite the first direction up to a first voltage rating across the first unidirectional circuit component, wherein the first unidirectional circuit component comprises a selectively controlled MOSFET; and
   a first transient voltage suppressor or Zener diode coupled in parallel with the first unidirectional circuit component between the input power supply connection and the device that consumes the input power, wherein the first transient voltage suppressor or Zener diode is configured to enable current to flow only in the first direction and block current flow in the second direction up to a second voltage rating across the first transient voltage suppressor or Zener diode that is less than the first voltage rating and to enable current to flow in the second direction above the second voltage rating to protect the first unidirectional circuit component from exposure to voltage beyond the first voltage rating.

2. The circuitry of claim 1, wherein the first unidirectional circuit component comprises a diode.

3. The circuitry of claim 1, comprising a MOSFET controller configured to activate the MOSFET when the voltage across the first unidirectional circuit component has a first polarity and deactivate the MOSFET when the voltage across the first unidirectional circuit component has a second polarity opposite the first polarity.

4. The circuitry of claim 1, comprising a ground transient voltage suppressor (TVS) diode or metal-oxide varistor (MOV) coupled between the input power supply connection and ground.

5. The circuitry of claim 1, comprising a bulk capacitor coupled between ground and a circuit node defined by an output of the first unidirectional circuit component and an output of the first transient voltage suppressor or Zener diode.

6. The circuitry of claim 5, comprising an inrush controller disposed between the bulk capacitor and the circuit node defined by the output of the first unidirectional circuit component and the output of the first transient voltage suppressor or Zener diode, wherein the inrush controller is configured to control a rate at which the bulk capacitor is charged by a transient current.

7. The circuitry of claim 1, comprising:
a second unidirectional circuit component coupled between the device that consumes the input power and a circuit node defined by an output of the first unidirectional circuit component and an output of the first transient voltage suppressor or Zener diode, wherein the second unidirectional circuit component is configured to enable current to flow only in the first direction and block current flow in the second direction opposite the first direction up to a third voltage rating across the second unidirectional circuit component; and
a second transient voltage suppressor or Zener diode coupled in parallel with the second unidirectional circuit component between the device that consumes the input power and the circuit node defined by the output of the first unidirectional circuit component and the output of the first transient voltage suppressor or Zener diode, wherein the second transient voltage suppressor or Zener diode is configured to enable current to flow only in the first direction and block current flow in the second direction up to a fourth voltage rating across the second transient voltage suppressor or Zener diode that is less than the third voltage rating and to enable current to flow in the second direction opposite the first direction above the second voltage rating to protect the second unidirectional circuit component from exposure to voltage beyond the third voltage rating.

8. The circuitry of claim 7, wherein the third voltage rating is the same as the first voltage rating.

9. The circuitry of claim 7, wherein the fourth voltage rating is the same as the second voltage rating.

10. The circuitry of claim 7, wherein:
the first unidirectional circuit component comprises a diode and the second unidirectional circuit component comprises a selectively controlled MOSFET; or
the second unidirectional circuit component comprises the diode and the first unidirectional circuit component comprises the selectively controlled MOSFET; or
the second unidirectional circuit component comprises the selectively controlled MOSFET and the first unidirectional circuit component comprises the selectively controlled MOSFET.

11. A power supply protection system for a direct current (DC) electric power delivery system comprising:

a bulk capacitor configured to couple between a direct current (DC) power supply input of one or more power-consuming electric devices and ground, wherein the bulk capacitor is configured to absorb surge-induced transient currents in a DC current supplied to the DC power supply input of the one or more power-consuming electric devices;
a first diode or MOSFET having a first voltage rating and configured to supply the DC current in one direction using DC power from an input power supply connection to the DC power supply input of the one or more power-consuming electric devices; and
a first Zener diode or transient voltage suppressor diode in parallel with the first diode or MOSFET, wherein the first Zener diode or transient voltage suppressor diode has a second voltage rating lower than the first voltage rating and wherein the first Zener diode or transient voltage suppressor diode is configured to protect the first diode or MOSFET from exposure to voltage beyond the first voltage rating.

12. The system of claim 11, comprising a power supply configured to supply the DC power to the input power supply connection.

13. The system of claim 12, wherein the bulk capacitor is configured to temporarily provide power to the system in response to a disruption in the power supply caused by a surge event.

14. The system of claim 11, comprising:
a second diode or MOSFET having a third voltage rating and configured to supply the DC current in one direction using DC power from the input power supply connection or another input power supply connection to the DC power supply input of the one or more power-consuming electric devices; and
a second Zener diode or transient voltage suppressor diode in parallel with the second diode or MOSFET, wherein the second Zener diode or transient voltage suppressor diode has a fourth voltage rating lower than the third voltage rating and wherein the second Zener diode or transient voltage suppressor diode is configured to protect the second diode or MOSFET from exposure to voltage beyond the first voltage rating.

15. The system of claim 14, wherein the second diode or MOSFET and the second Zener diode or transient voltage suppressor diode are coupled in series to the first diode or MOSFET and the first Zener diode or transient voltage suppressor diode.

16. A power supply protection system for an electric device that consumes direct current (DC) electric power, the system comprising:
an input power supply connection configured to receive the DC electric power as an input;
a first pair of unidirectional circuit components coupled in parallel between the input power supply connection and a power supply input of the electric device and configured to provide a DC electric current in one direction while operating within rated voltages, wherein the first pair of unidirectional circuit components comprises a first unidirectional circuit component having a first voltage rating and a second unidirectional circuit component having a second voltage rating lower than the first voltage rating, wherein the second unidirectional circuit component is configured to be unidirectional up to the second voltage rating and to allow current to flow in an opposite direction above the second voltage rating to prevent current from flowing across the first unidirectional circuit component during reverse power surge events; and, a second pair of unidirectional circuit components coupled in parallel between a second input power supply connection and the power supply input of the electric device.

17. The power supply protection system of claim 16, wherein the first pair of unidirectional circuit components or the second pair of unidirectional circuit components is selected based on whether there is a greater positive voltage output at the input power supply connection or the second input power supply connection.

18. The power supply protection system of claim 16, comprising a second pair of unidirectional circuit components coupled in parallel between the input power supply connection and the power supply input of the electric device, wherein the second pair of unidirectional circuit components are coupled in series with the first pair of unidirectional circuit components.

19. A power supply protection system for an electric device that consumes direct current (DC) electric power, the system comprising:

an input power supply connection configured to receive the DC electric power as an input;

a first pair of unidirectional circuit components coupled in parallel between the input power supply connection and a power supply input of the electric device and configured to provide a DC electric current in one direction while operating within rated voltages, wherein the first pair of unidirectional circuit components comprises a first unidirectional circuit component having a first voltage rating and a second unidirectional circuit component having a second voltage rating lower than the first voltage rating, wherein the second unidirectional circuit component is configured to be unidirectional up to the second voltage rating and to allow current to flow in an opposite direction above the second voltage rating to prevent current from flowing across the first unidirectional circuit component during reverse power surge events; and a second pair of unidirectional circuit components coupled in parallel between the input power supply connection and the power supply input of the electric device, wherein the second pair of unidirectional circuit components are coupled in series with the first pair of unidirectional circuit components.

* * * * *